United States Patent [19]

Nishiwaki et al.

[11] Patent Number: 5,181,265
[45] Date of Patent: Jan. 19, 1993

[54] OPTICAL COUPLING APPARATUS FOR INTRODUCING AND COUPLING AN INCIDENT LIGHT INTO A WAVE GUIDE

[75] Inventors: Seiji Nishiwaki; Shinji Uchida, both of Osaka; Junichi Asada, Ibaraki, all of Japan

[73] Assignee: Matsushita Electric Industrial Co., Ltd., Osaka, Japan

[21] Appl. No.: 675,527

[22] Filed: Mar. 26, 1991

[30] Foreign Application Priority Data

Mar. 26, 1990 [JP] Japan ................................. 2-76030
Jul. 9, 1990 [JP] Japan ................................. 2-180807

[51] Int. Cl.⁵ .............................................. G02B 6/32
[52] U.S. Cl. .................................. 385/33; 385/27; 385/37; 385/93; 359/42
[58] Field of Search ............... 350/96.11, 96.12, 96.15, 350/96.19, 162.2, 162.21, 162.23; 250/201.5; 369/44.12, 44.14, 44.17, 109, 110, 112; 385/27, 31, 33, 37, 88, 93; 359/569, 570, 572, 489, 494, 484, 500, 37, 41, 42

[56] References Cited

U.S. PATENT DOCUMENTS

| | | | |
|---|---|---|---|
| 4,885,732 | 12/1989 | Sunagawa et al. | 369/44 |
| 4,887,255 | 12/1989 | Handa et al. | 369/112 |
| 4,937,808 | 6/1990 | Shimada et al. | 369/112 |
| 4,945,527 | 7/1990 | Sunagawa | 369/44.11 |
| 4,971,414 | 11/1990 | Funato et al. | 350/96.19 |
| 4,991,919 | 2/1991 | Nishiwaki et al. | 350/96.19 |

FOREIGN PATENT DOCUMENTS 0276873 8/1988 European Pat. Off.
0357780 3/1990 European Pat. Off.

Primary Examiner—Frank Gonzalez
Attorney, Agent, or Firm—Wenderoth, Lind & Ponack

[57] ABSTRACT

A photocoupler has a polarization converting device for converting laser light emitted from a laser source to a polarized beam of light having electric vectors oriented in a direction of a tangent of a circle having its center on an optical axis of the photocoupler and the phase of which beam is shifted by $\pi$ at the boundary of a declination line passing the center of the circle. The wave front of the converted laser light is spherical. And, a photocoupler for exciting a waveguided light which propagates radially from the center thereof is positioned so that the input coupling efficiency becomes maximum.

14 Claims, 8 Drawing Sheets

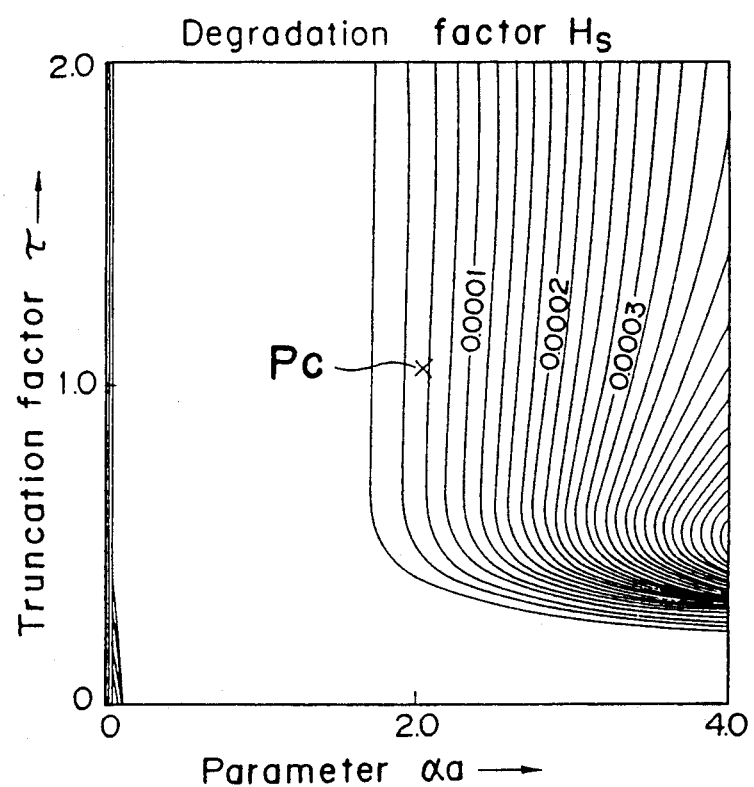

OPTICAL COUPLING APPARATUS FOR INTRODUCING AND COUPLING AN INCIDENT LIGHT INTO A WAVE GUIDE

BACKGROUND OF THE INVENTION

1. Field of the Invention

The present invention relates to an optical coupling apparatus for introducing and coupling incident light to a wave guide.

2. Description of the Prior Art

A prior art optical coupling apparatus will be explained at first referring to, for instance, that disclosed in PCT laid-open publication No. WO 89/06424 which employs a so-called grating coupling method.

FIG. 4 is a schematical cross-sectional view of the conventional optical coupling apparatus. Light of a wavelength $\lambda$ emitted from a laser diode 1 is converted into a parallel beam 6A by a condenser lens 2 and is then converted, via a polarizer device 3, into a circumferentially polarized beam 6C in which the electric field vectors are oriented in tangential directions of concentric circles. The polarized beam 6C is incident upon a circular coupler 5, comprising a grating of concentric circles of a pitch $\Lambda$ in a radial direction which is formed on a wave guide layer 4 having an equivalent refractive index N, and has a radiation decay factor $\alpha$. If $\Lambda$ and N are in a relation $q\lambda/\Lambda = -N$ wherein q is a negative integer, a phase matching condition is satisfied. If this condition is satisfied, the incident polarized beam 6C excites a waveguided light propagating in a radially outward direction and a waveguided light propagating in a radially inward direction simultaneously (this relation is called simultaneous exciting condition) and these interfere with each other resulting in a waveguided light 7 propagating in a radially outward direction. The wave guide layer 4 is formed on a transparent substrate 8 having a refractive index lower than that of the wave guide layer 4.

The polarization converting device 3 comprises a liquid crystal polarizer 3L and a phase difference film 3P as shown in FIG. 5a (see, for example, Japanese Patent laid-open publication No. H1-246808). The liquid crystal polarizer 3L has two transparent substrates 9 and 10 and a nematic liquid crystal 11 interposed between the substrates. Surfaces of one substrate 9 and the other substrate 10 formed with a polyamide film are rubbed in one direction and a rotational direction, respectively, so that the liquid crystal orients in one direction at one side thereof confronting substrate 9 and in concentric tangential directions at the other side thereof confronting substrate 10 and, accordingly, the twist angle of the molecules of the liquid crystal in a direction of the thickness thereof varies continuously in declination. When a linearly polarized beam of light having an oscillation direction which coincides with the direction of orientation of the liquid crystal 11 at the incident side is incident on a layer of the liquid crystal 11 having an optimized thickness, the plane of oscillation of the light is rotated along the twist angle of the molecules of the liquid crystal. Accordingly, the linearly polarized beam 6A is twisted in the thickness direction of the device by an angle nearly equal to the twist angle and becomes a light beam 6B having a plane of oscillation substantially coincident with the orientation direction of the molecules of the liquid crystal at the output side 10. However, since the molecules of the liquid crystal are declined at a declination line extending through the center of the device and substantially coinciding with the orientation direction at the incident side 9 and since the plane of oscillation of the light is also declined thereat, the phase of the light in one semicircular area divided by the declination line is delayed by $\pi$ from that of the light in the other semicircular area. In order to adjust the delay in phase, a phase difference film 3P of $\lambda/2$ is provided on the emission side surface of the transparent substrate 10. By aligning the boundary line 13 of the phase difference film 3P with the declination line 12, the phase of the emitted light in the one semicircular area coincides with that in the other semicircular area and, thus, a completely circumferentially polarized beam 6C is obtained.

The coupling efficiency of the incident light to the guided light, namely the ratio of an amount of the incident light to that of the guided light is given by solving so-called mode coupling equation, as known to those skilled in the art. However, since it is very complicated to solve the mode coupling equation under the simultaneous exciting condition as mentioned above, the solution is estimated by extrapolating a solution obtained by solving the mode coupling equation under a non-simultaneous exciting condition. As the result thereof, the input coupling efficiency in the case that an error $d\lambda$ of the wavelength, an error $dN$ of the equivalent refractive index and an error $d\Lambda$ of the pitch are caused from the state wherein the phase matching condition is satisfied is given by the following equation provided that the incident light has an amplitude represented by a Gauss function $\exp\{-(r/\tau a)^2\}$ wherein r is a distance from the center axis of the coupler and assuming $\kappa = 2\pi/\lambda$.

$$\eta/\sigma e_r^2 = 8\alpha a \{G_1(1)\exp(-\alpha a)/\tau\}^2 \{1-(\kappa aN\epsilon)^2 H_D\} \quad (1)$$

wherein $$H_D = G_3(5)/G_1(1) - \{G_2(3)/G_1(1)\}^2 \quad (2)$$

$$\epsilon = dN/N - d\lambda/\lambda + d\Lambda/\Lambda \quad (3)$$

$$G_1(n) = \int_0^1 t^{n/2} (g_P - I_{B8M}) dt \quad (4)$$

$$G_2(n) = \int_0^1 t^{n/2} (g_P + I_{B8M}) dt \quad (5)$$

$$G_3(n) = \int_0^1 t^{n/2} \frac{(g_P + I_{B8M})^2}{g_P - I_{B8M}} dt \quad (6)$$

$$g_P(t) = \exp\{-(t/\tau)^2 + \alpha at\} \quad (7)$$

$$g_M(t) = \exp\{-(t/\tau)^2 - \alpha at\} \quad (8)$$

Radiation from the centripetal waveguided light includes a incident light and a light propagating in a reversed direction and $\sigma$ of the equation (1) indicates a ratio of the amount of the latter to the former. If the grating has a symmetrical cross-section, $\sigma \approx \frac{1}{2}$ in the case of two beam coupling and if a blaze grating is used, $\sigma \approx 1$. Further, $e_r$ represents a component of oscillation in a direction of a tangent of a circle with respect to a unit electric vector of the input light. If the input light is a circumferentially polarized light beam, $e_r = 1$ and, if it is a circularly polarized light beam, $e_r = 1/\sqrt{2}$. $H_D$ given by the equation (2) represents a degree of the tendency of the coupling efficiency to degrade due to errors.

The function $I_B$ used in the equations (4) to (6) represents a factor which determines a manner of the interference between the centrifugally propagating waveguided light and the centripetal propogating waveguided light both excited by the incident polarized beam 6C. If the interference is positive, namely both interfere so as to strengthen, $I_B = -1$ (called regular phase condition). $I_B = 0$ (called single phase condition) indicates no interference and $I_B = 1$ (called reciprocal phase condition) indicates that both interfere so as to weaken.

FIGS. 6a, 6b and 6c show normalized coupling efficiencies $\eta/\sigma e_r^2$ calculated for regular phase, single phase and negative phase conditions, respectively, which are represented as contours on a plane defined by a product $\alpha a$ of the radiation decay factor $\alpha$ and the radius "a" of the coupler and the truncation factor $\tau$ for the Gaussian incident light defined by a Gauss function $\exp\{-(r/\tau a)^2\}$.

They take maximum values 1.438, 0.706 and 0.502 at points Pa(0.60, 0.79), Pb(1.23, 0.91) and Pc(2.26, 1.04), respectively.

FIGS. 7a, 7b and 7c show the degradation factors $H_D$ calculated for regular phase, single phase and reciprocal phase conditions, respectively, which are represented as contours on a plane defined by a product $\alpha a$ and the truncation factor $\tau$.

They take values 0.022, 0.064 and 0.025 at points Pa, Pb and Pc mentioned above.

The condition necessary to suppress the degradation of the coupling efficiency to within 20% under the maximum efficiency condition (namely, at respective points Pa, Pb and Pc) is given by the next equation.

$$|a\ Ne/\lambda| < \begin{bmatrix} 0.48 \text{ for regular phase cond.} \\ 0.28 \text{ for single phase cond.} \\ 0.45 \text{ for reciprocal phase cond.} \end{bmatrix} \quad (9)$$

As can be understood from results obtained by the analysis mentioned above, the conventional light coupling device has disadvantages as follows.

At first, the coupling efficiency under the phase matching condition is $\eta = 25\%$ at the maximum assuming $\sigma = 0.5$ (see the point Pc of FIG. 6c) in the case that the incident light is concentric circularly polarized light (or radially polarized light) in which electric vectors thereof have directions opposite to each other at opposite points, whereby, phases of the guided waves excited shift by $\pi$ with respect to each other resulting in the negative phase condition.

Next, in order to satisfy the condition given by the equation (9), the radius a of the coupler should be smaller than $0.45\lambda/\epsilon N$ ($a < 0.45\lambda/\epsilon N$) and, accordingly, $\alpha/\epsilon$ should be larger than $5N/\lambda$ in the case of the maximum efficiency condition ($\alpha a = 2.26$ at Pc of FIG. 6c). This means that $\alpha/\epsilon$ must be larger than $1.1 \times 10^4$ (1/mm) when $\lambda = 0.8$ μm and N=1.7.

This requires a technique for forming an extra-thin film having a high refractive index to obtain a large $\alpha$ but, in general, it is said difficult to make $\alpha$ larger than 50 (1/mm) in the grating coupler.

Further, since the laser diode emits light deviating in wavelength at about ±0.5% and the wave guide layer has an error of the equivalent refractive index of about ±0.5% due to inconsistencies in the thickness and the refractive index thereof, a total error $\epsilon$ may be estimated to be of about ±1%. Accordingly, the condition $\alpha/\epsilon > 1.1 \times 10^4$ (1/mm) is too severe to realize. This is the second problem.

SUMMARY OF THE INVENTION

An object of the present invention is to provide an optical coupling device having a high coupling efficiency by solving the problems mentioned above.

Another object of the present invention is to provide an optical coupling device having wide tolerances to various errors while maintaining a high coupling efficiency.

In order to achieve this object, according to the present invention, there is provided an optical coupling apparatus comprising: a laser source which emits a divergent beam of laser light; a polarization converting means for converting laser light emitted from said laser source to a polarized beam the electric vectors of which are equal at positions diagonally opposite to each other; a wave guide lying in a plane perpendicular to the optical axis along which said laser light is introduced thereto; and photocoupling means arranged on said wave guide, said photocoupling means having a concentric periodic structure, wherein said photocoupling means is arranged at a position relative to said laser source which gives a maximum coupling efficiency to said polarized light incident thereto.

Further, according to another facet of the present invention, there is provided an optical coupling apparatus comprising: a laser source which emits a divergent beam of laser light; a polarization converting means for converting laser light emitted from said laser source to a polarized beam, the electric vectors of which are equal at positions diagonally opposite to each other; a wave guide arranged on a plane perpendicular to the optical axis along which said laser light is introduced thereto; photocoupling means arranged on said wave guide, said photocoupling means having a concentric periodic structure; and condenser lens means arranged between said laser source and said photocoupling means to make the light incident on said photocoupling means converge, wherein said photocoupling means is arranged at a position relative to said laser source which gives a maximum coupling efficiency to said polarized light incident thereto.

The photocoupler according to the present invention satisfies the so-called regular phase condition since the incident light is polarized by the polarization converting device so as to have electric vectors equal at positions diagonally opposite to each other. In this case, there exists a solution which gives the maximum input coupling efficiency since the incident light is divergent or convergent beam of light (e.g. has a spherical wavefront). Accordingly, the coupler can be positioned at the best position relative to the laser source, so that an extremely high coupling efficiency can be obtained. This allows relatively large tolerances for the wavelength, the equivalent refractive index, the pitch of grating and the like.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 2a, 2b and 2c are contour maps of the degradation factors $H_S$ as plotted by coordinates $\alpha a$ and $\tau$ under regular phase, single phase and reciprocal phase conditions, respectively.

DETAILED DESCRIPTION OF THE PREFERRED EMBODIMENTS

Figure 1:
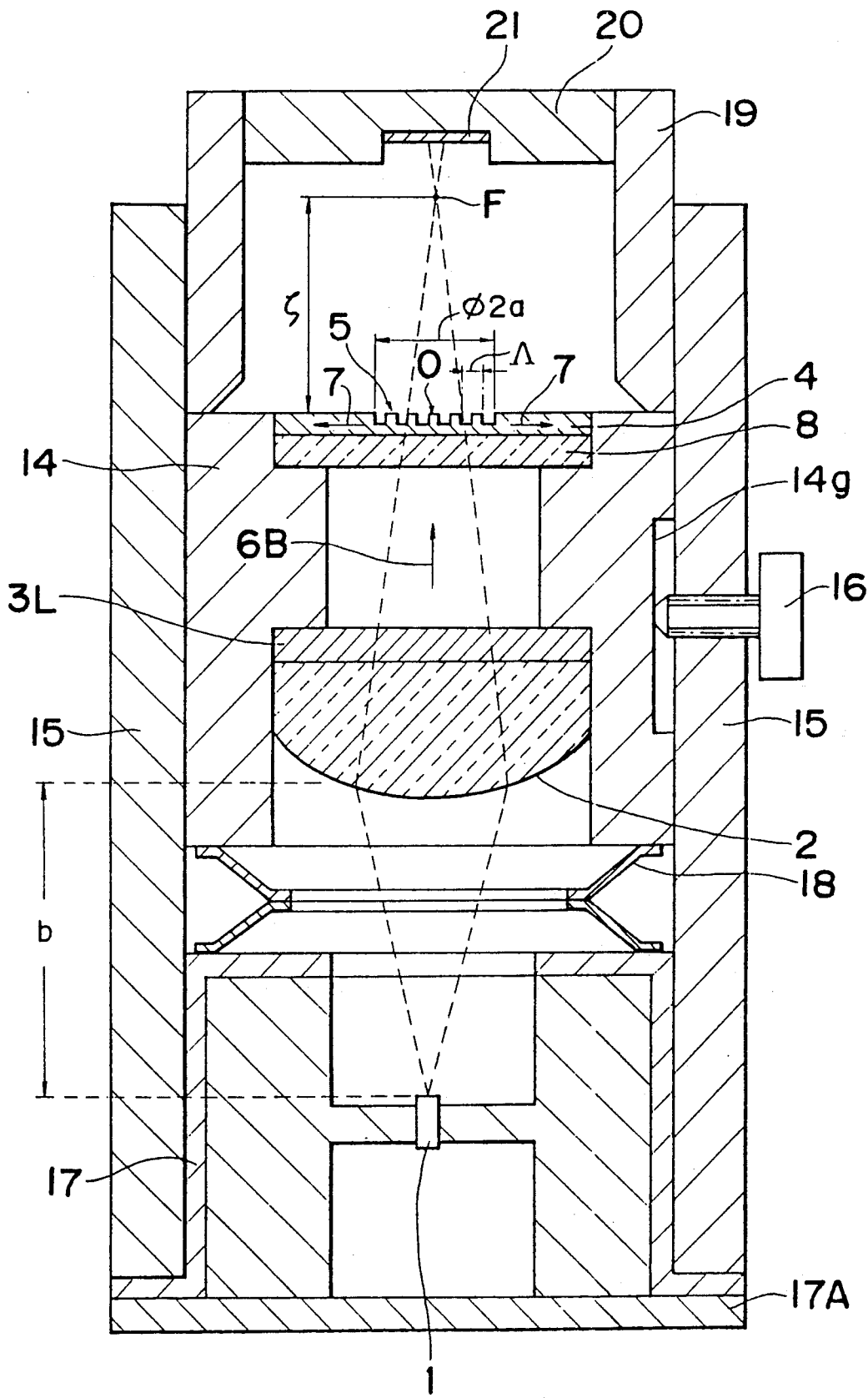
FIG. 1 is a cross-sectional view of the optical coupling device according to the first preferred embodiment of the present invention.

FIG. 1 shows an optical coupling apparatus according to the first preferred embodiment of the present invention.

A laser beam emitted from a laser diode 1, housed in a laser tube 17 and a cover plate 17A fixed thereto, becomes a convergent beam focused at a focal point F by passing through a condenser lens 2 held by a cylindrical holder 14. The beam is converted into a polarized light beam 6B having electric vectors oriented in tangential directions of a circle but having phases shifted by $\pi$ at two opposite points on the circle by a polarization converting device 3L set on the condenser lens 2.

The polarized beam is inputted to a circular coupler 5 of a radius "a" which provides concentric circles of a pitch formed on a wave guide layer 4 orthogonal to the optical axis of the apparatus. The input light excites a waveguided light 7 which propagates radially from the center O of the coupler 5.

The coupler 5 is located forward or rearward of the focal point F of the condenser lens 2 by a distance c (c>0 or c<0). The wave guide layer 4 is formed on a transparent substrate 8 having a refractive index smaller than that of the wave guide layer 4. The substrate 8 is mounted on the holder 14 coaxially with the condenser lens 2. The holder 14 is slidably guided in a direction of the optical axis by a guide cylinder 15 and is biased upwardly by a pair of leaf springs 18 inserted between the laser tube 17, fixed to the bottom of the guide cylinder 15 by an adhesive agent, and the holder 14.

Upon assembly, the holder 14 is manually pushed down, using a cylindrical tool 19, against the spring force exerted by the leaf spring 18 and is fixed at a desired position by a set screw 16 which extends in a groove 14g, formed on the outer wall of the holder 14, to engage the holder 14. The position of the holder 14 to be set is determined so that the amount of light detected by a photo-sensor 21 fixed on a sensor holder 20 becomes minimum.

Figure 5A:
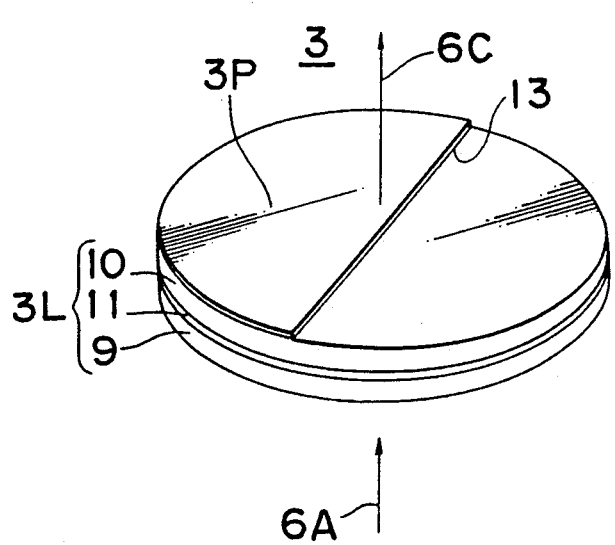
FIG. 5a is a perspective view of a conventional polarization converting device 3 shown in FIG. 4.
Figure 5B:
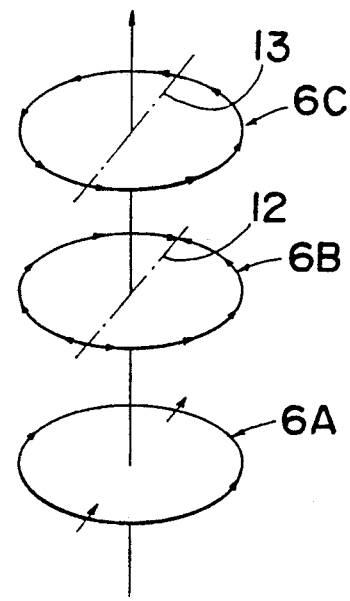
FIG. 5b is an explanatory diagram illustrating states of polarization of the polarization converting device 3.

The polarization converting device 3L is substantially the same as that obtained when the phase difference film 3P is removed from the conventional converting device 3 shown in FIG. 5a, thought it is not shown in detail in FIG. 1.

Namely, as stated with respect to FIG. 5a, the phase of the light passing through one semicircular area thereof divided by the declination line 12 is shifted by $\eta$ to that of the light passing through the other semicircular.

Since the coupling is effected by a convergent or divergent beam of light in the present preferred embodiment and does not give rise to the simultaneous exciting condition, except for in the vicinity of the center of the coupler, only a centrifugally propagating waveguided light is excited.

The following relation is established between the input light and the waveguided light in the coupler under the non-simultaneous exciting condition according to the following coupling equation.

$$dA/dr = iKA_0 e_r \exp\{i(\kappa N - t) r\} - (\alpha + \tfrac{1}{2}r)A \tag{10}$$

wherein r is distance from the center O of the coupler, A is an amplitude of the waveguided light, Ao is an amplitude of the input light, K is a coupling coefficient of the input light to the waveguided light, N is an equivalent refractive index of the wave guide layer, t is a magnitude of an image, orthogonally projected on the surface of the coupler, of a vector which is a composite of q-times of the grating lattice vector (q is an order of coupling) and an input light propagation vector, $\alpha$ is a radiation decay factor of the grating coupler and ($\tfrac{1}{2}r$) indicates an amplitude damping due to a sectorial in-plane divergence accompanied by propagation of the waveguided light.

The grating pitch $\Lambda$ is obtained by solving the following equation in the present preferred embodiment assuming that a spherical aberration caused upon light passing through a parallel substrate such as the substrate 8 can be neglected although it actually influences the phase matching condition to a minor extent.

$$\{1 + I_B \exp(-2\alpha r)\}\tan\{\kappa r(N - q\lambda/\Lambda)\} = -\{1 - I_B \exp(-2\alpha r)\}\tan\{\kappa r^2 \zeta/|\zeta|(r^2 + \zeta^2)^{\frac{1}{2}}\} \tag{11}$$

Assume that the coupler is shifted by a small distance $\delta$ in order to correct the error $\epsilon$ from the state satisfying the phase matching condition as represented by the equation (3) in relation to the errors of $\lambda$, N and $\Lambda$ and that the distance $\delta$ is very small when compared with $\zeta$ and, accordingly, a change in the truncation factor $\tau$ due thereto is negligibly small. Further, the incident light has a Gaussian amplitude as represented by $\exp\{-(r/\tau a)^2\}$.

The input coupling efficiency is given as follows by solving the equation (10) assuming $H_F = G_4(9)/G_1(1)$.

$$\begin{aligned}\eta/\sigma e_r^2 = &\, 8\alpha a \{G_1(1)\exp(-\alpha a)/\tau\}^2 \\ &\times \{1 + 2(\kappa^2(\kappa a^2/\zeta))^2 I_B H_F\}^2 \\ &\times [1 - \kappa^2(a/\zeta)^4 \{H_c(\delta - h_S N E \zeta^2/a)^2 \\ &+ H_S(N E \zeta^2/a)^2\}] \end{aligned} \tag{12}$$

wherein $$G_4(n) = \int_0^1 t^{n/2} \frac{g_p g_M (g_p - I_{BgM})}{(g_p + I_{BgM})^2} dt \tag{13}$$

$$h_S = \{G_2(7)G_1(1) - G_1(5)G_2(3)\}/\{G_1(9)G_1(1) - G_1^2(5)\} \quad (14)$$

$$H_c = G_1(9)/G_1(1) - \{G_1(5)/G_1(1)\}^2 \quad (15)$$

$$H_S = H_D - h_S^2 H_c \quad (16)$$

It is to be noted that the equation (12) coincides with the eqation (1) if $|\zeta| \to \infty$ and $\delta = 0$. Namely, the equation (1) is an equation obtained by extrapolating the solution of the equation (12) which is obtained by solving the equation (10) under the non-simultaneous exciting condition, as stated before. Since the present preferred embodiment satisfies the non-simultaneous condition substantially, the equation (12) representing the coupling efficiency can be applied effectively.

In the above equations, $H_F$ indicates a degree of change in the coupling efficiency associated with convergent light, that is with a shift from vertical incidence, Hc indicates a degree the tendency the coupling efficiency to degrade due to an error of the position of the coupler and $H_S$ indicates a degree of the tendency of the coupling efficiency to degrade when the position of the coupler is optional. $H_F$ is a positive number and takes values 0.2 and 0.008 at Pa and Pc of FIGS. 6a and 6c, respectively. Since $h_S$ is a coefficient which gives an optimal distance for moving the coupler (it takes values 0.53, 0.85 and 0.57 at points Pa, Pb and Pc, respectively), and $H_S > 0$, the optimal distance which makes the input coupling efficiency maximum is given by $\delta = h_S N \epsilon \zeta^2/a$, as is apparent from the equation (12).

In other words, there exists a solution which gives the maximum coupling efficiency even if the coupler has a relatively large total error $\epsilon$ due to errors of $\lambda$, N and $\Lambda$. Though the position of the coupler which gives the maximum coupling efficiency can be calculated theoretically as mentioned above, it is easily detected optically.

This is done by detecting the amount of light passing through the coupler 5 using the photosensor 21. The minimum output of the photosensor 21 gives the best position of the coupler. As stated above, the holder 14 is pressed down using the pressing tool 19 and, then, moved upwardly by the spring force while monitoring the output of the photosensor. When the output of the photosensor 21 becomes minimum, the holder 14 is fixed by the screw 16. The measurement of the input coupling efficiency is not limited to the above and, the streaking light of the input waveguided light 7 or the amount of radiation light from one more coupler formed on the wave guide layer 4 may be measured.

Figure 2A:
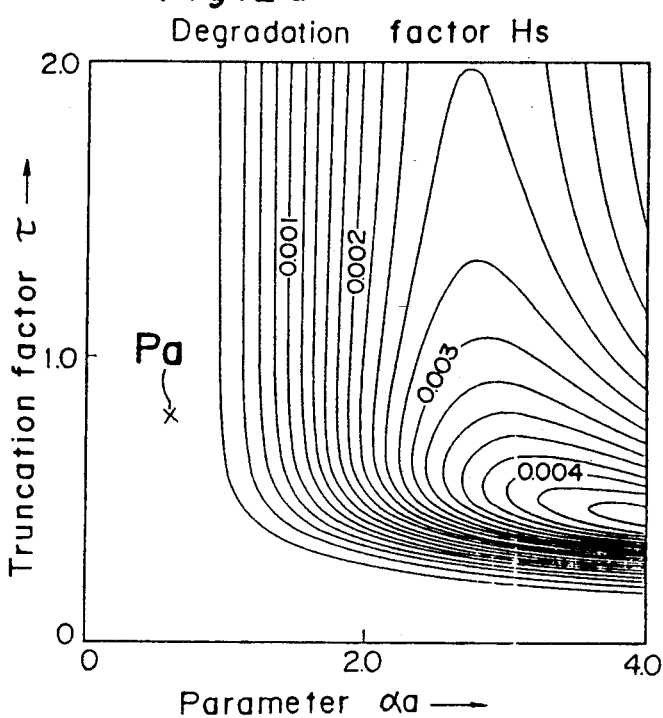
Figure 2B:
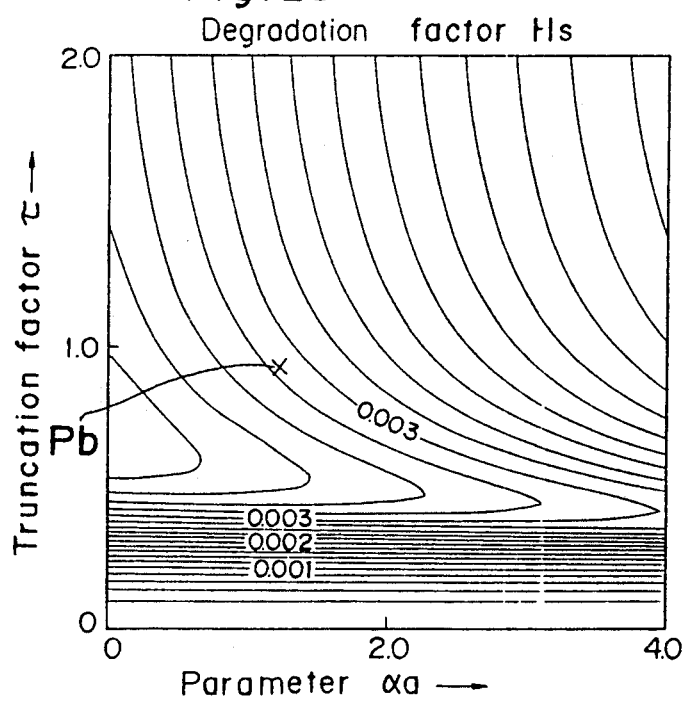

FIGS. 2a, 2b and 2c are contour maps on coordinate axes defined by $\alpha a$ and $\tau$ which show the degradation factor $H_S$ calculated for the regular phase, the single phase and reciprocal phase conditions, respectively. $H_S$ takes values $2.0 \times 10^{-5}$, $3.2 \times 10^{-3}$ and $8.5 \times 10^{-5}$ at points Pa, Pb and Pc, respectively.

As stated above, the boundary condition is the regular phase condition in the present preferred embodiment since the electric vectors of the input light are equal at opposite positions and the phases of the waveguided light excited coincide.

Figure 6A:
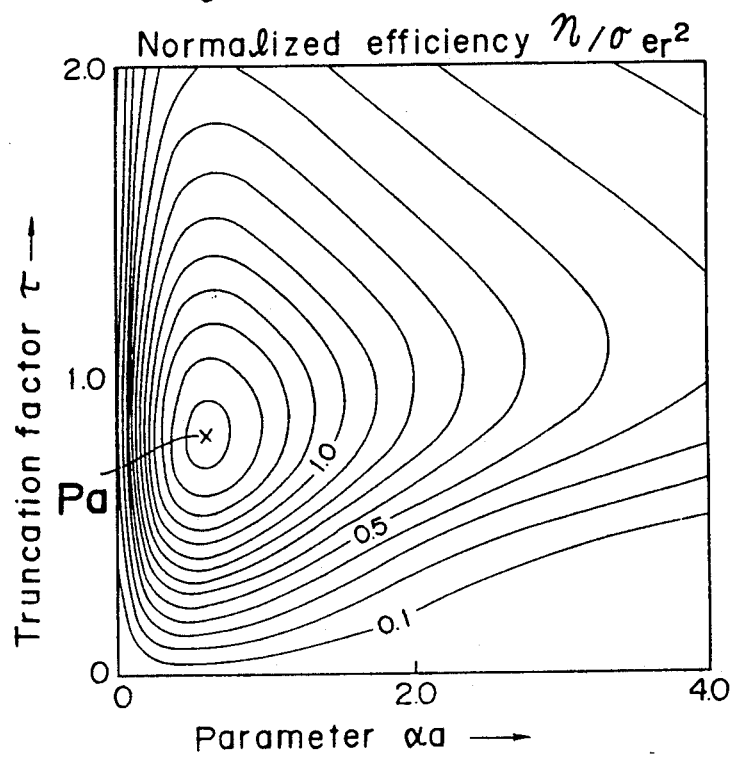
FIGS. 6a, 6b and 6c are contour maps of normalized coupling efficiencies $\eta/\sigma e_r^2$ obtained, according to the conventional device, under regular phase, single phase and reciprocal phase conditions as plotted by coordinates $\alpha a$ and $\tau$, respectively.
Figure 6B:
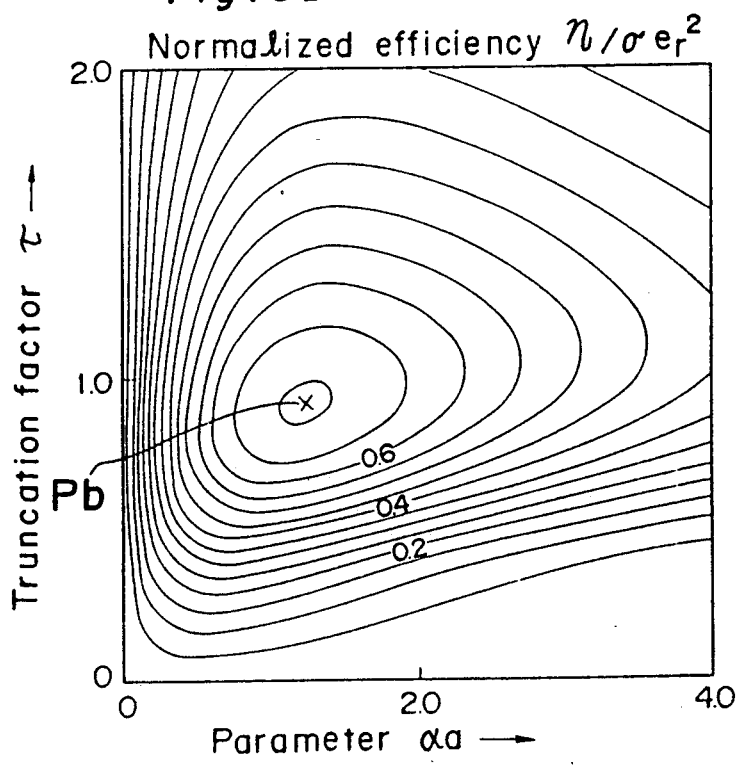
Figure 6C:
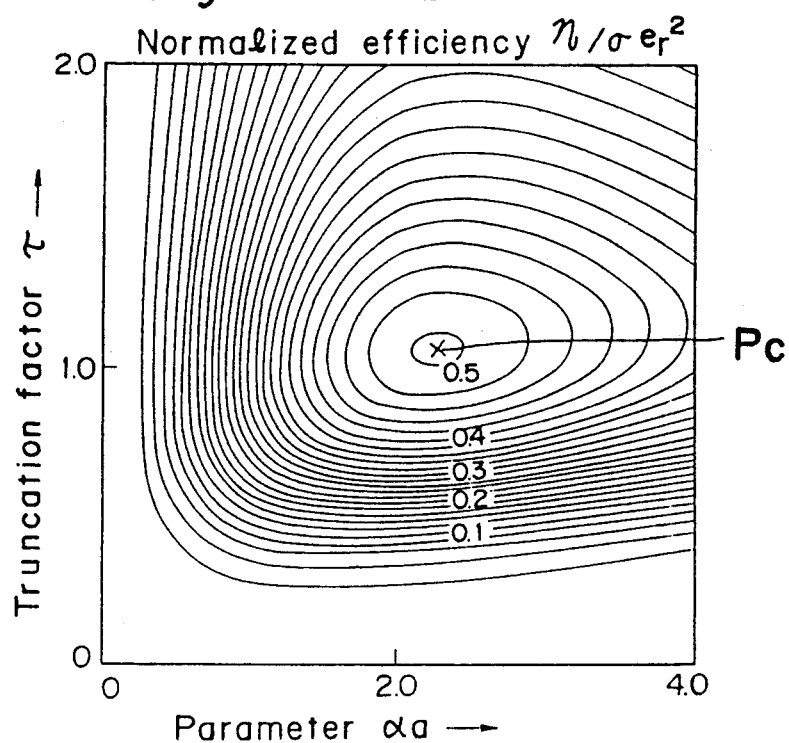

The coupling efficiency under the phase matching condition becomes $\eta = 71.9\%$ at the point Pa, assuming $\sigma = 0.5$, which is about three times as large as that shown in FIG. 6a. Although the coupling efficiency shown in FIG. 6a is not exact since it is estimated by extrapolating a solution obtained under the non-simultaneous exciting condition to the simultaneous exciting condition, it is understood qualitatively that the coupling efficiency becomes large under the regular phase condition when compared with the single phase condition and the reciprocal phase condition. Namely, under the regular phase condition, the phase of the centripetally propagating waveguided light which propagates in a centrifugal direction after passing the center of the coupler coincides with that of the centrifugal propagating wave so as to strengthen each other.

Figure 7A:
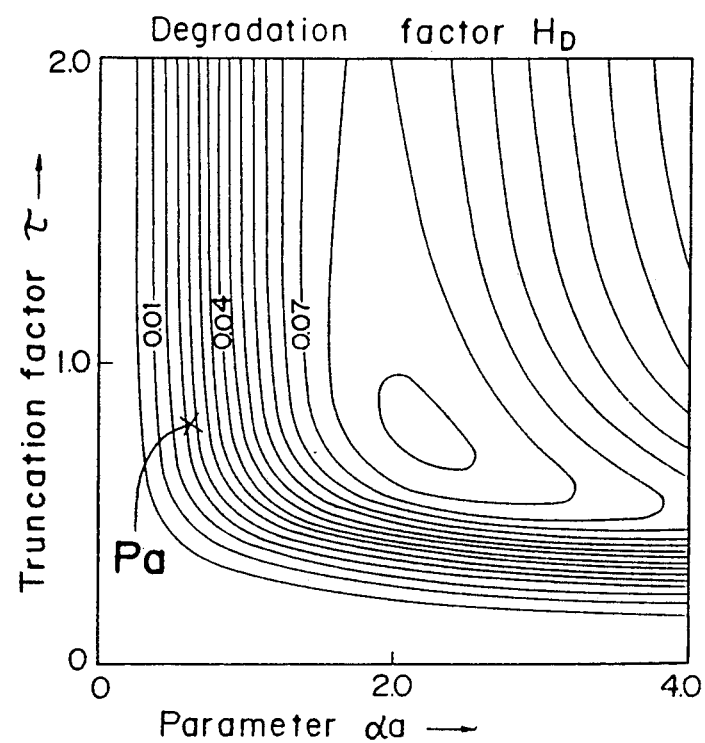
FIGS. 7a, 7b and 7c are contour maps of degradation factors $H_D$ obtained, according to the conventional device, under regular phase, single phase and reciprocal phase conditions, respectively.
Figure 7B:
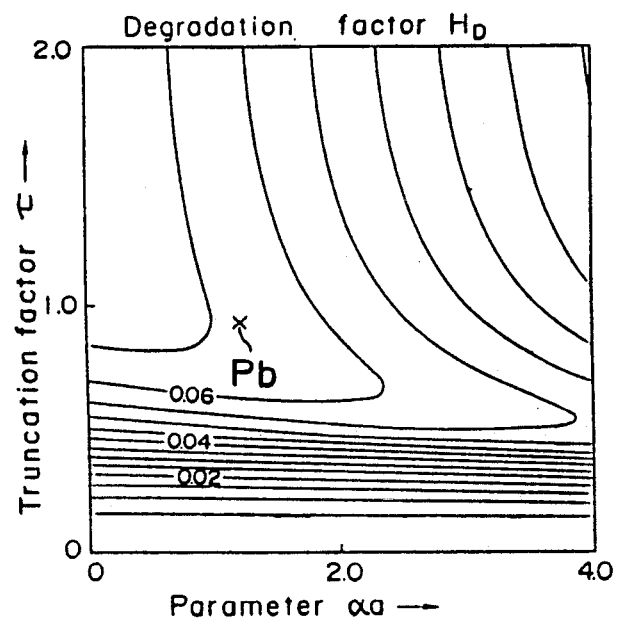
Figure 7C:
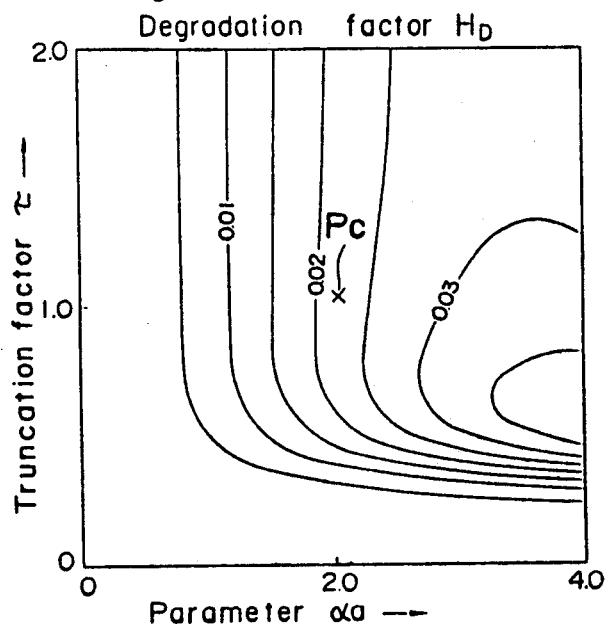

Further, it is to be noted that the degradation factor under the regular phase condition can be lowered to one in the order of 1/1000 of that under the single phase or the negative phase condition, as is apparent from comparison of FIG. 2a showing one adjusted by $\delta(=h_S N\epsilon\zeta^2/a)$ with FIG. 7a showing one before the adjustment ($\delta=0$). This means that tolerances of errors regarding the wavelength $\lambda$, the equivalent refractive index N, the pitch $\Lambda$ and the like can be allowed to have relatively large values, for example about $33(\approx 1/\sqrt{1000})$ times as large as those required in the conventional coupler.

Thus, a high coupling efficiency with a small degradation factor can be obtained according to the present invention.

The optimization of the coupling efficiency by the positional adjustment of the coupler in the first preferred embodiment is effective for deviations of the wavelength due to differences among light sources. However, it is not effective for a time-dependent variation of the wavelength. It is known in the laser diode that the emitting point thereof moves according to an emission power and a temperature thereof and that the amount of such movement corresponds to an amount of variation in the wavelength. It becomes possible to compensate for the time dependent variation in the wavelength of the laser diode by utilizing the property mentioned above. For instance, assume that the emitting point thereof shifts toward the condenser lens 2 by $\epsilon_L d\lambda$ when the wavelength varies by $d\lambda$. If the emitting point is located at a position distant from the condenser lens 2 of a focal length f by a distance b (b>f) at first, the focal point F shifts by $\epsilon_L d\lambda f^2/(b-f)^2$ away from the lens 2 when the emitting point shifts by $\epsilon_L d\lambda$. Accordingly, if the next equation is satisfied, the degradation of the coupling efficiency due to the variation of the wavelength can be cancelled completely.

$$\epsilon_L f^2/(b-f)^2 = h_S N \zeta^2/a\lambda \quad (17)$$

This condition can be satisfied actually since $\epsilon_L$ takes a value of about $10^3$ in a direction of the junction plane of the laser diode, $h_S$ takes values of 0.53, 0.85 and 0.57 at points Pa, Pb and Pc, respectively, and accordingly, $\zeta(b-f)/f$ is estimated to take a value of about $10^3$ a$\lambda$. However, the equation (17) is not practical since the emitting point moves not only in a direction of the junction plane but also in a direction of a line normal thereto. Assuming that it shifts by $\epsilon_S d\lambda$ in the direction of the normal line, the equation (17) should be revised as follows.

$$(\epsilon_P + \epsilon_S)f^2/2(b-f)^2 = h_S N\zeta^2/a\lambda \quad (18)'$$

Though the coupler 5 is shifted by the holder 14 in the first preferred embodiment, the same effect can be obtained by moving the laser diode 1 or the condenser lens 2. Also, the polarization converting device 3L may be replaced by a device which converts linearly polarized light to a polarized beam wherein the electric vector thereof has phases shifted by $\pi$ at opposite positions in a direction of the radius vector or a ¼ wavelength plate since each satisfies the regular phase condition.

Figure 3:
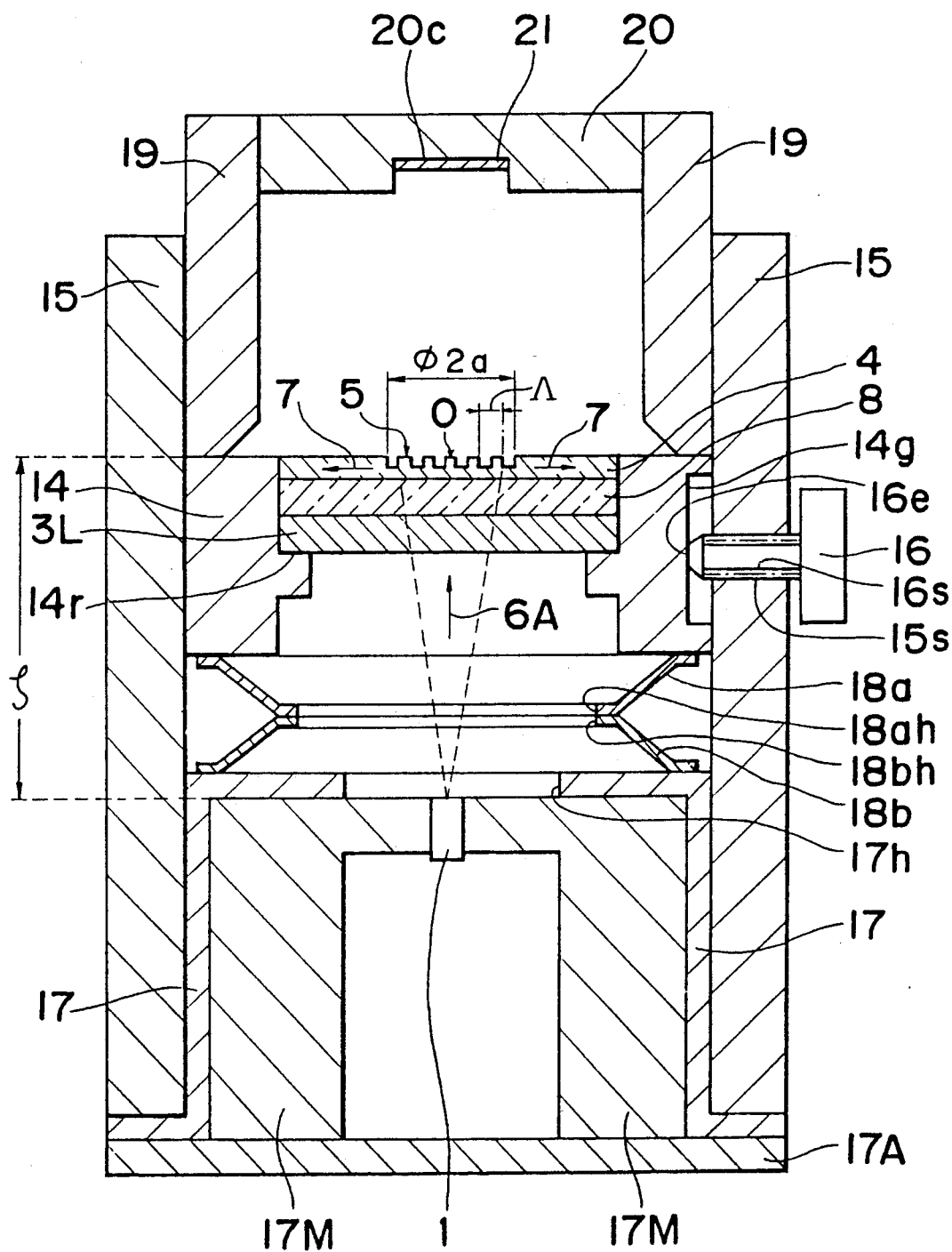
FIG. 3 is a cross-sectional view of the optical coupling device according to the second preferred embodiment of the present invention.
Figure 4:
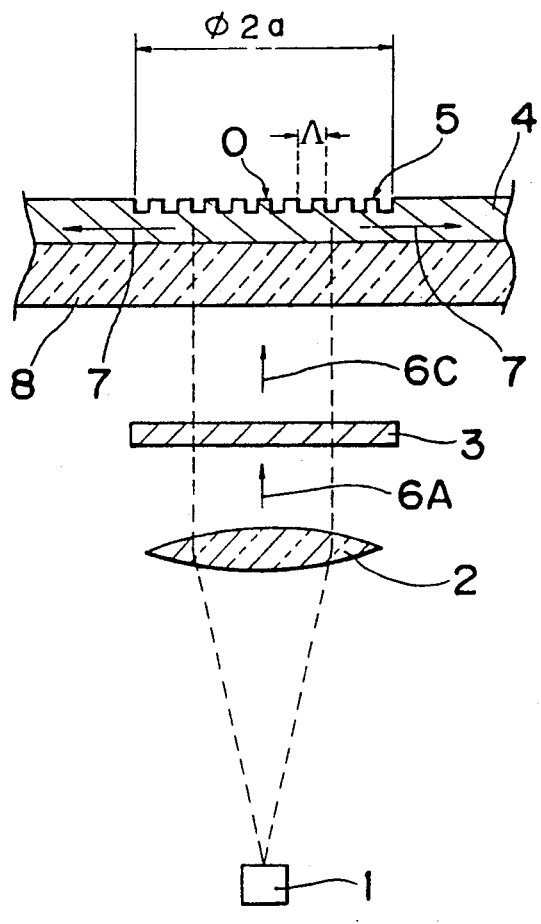
FIG. 4 is a cross-sectional view of a conventional optical coupling device.

FIG. 3 is a cross-sectional view of the second preferred embodiment of the present invention. Elements which are the same as those in FIG. 1 are designated by the same reference numberals in FIG. 3 and a detailed explanation thereof will be omitted.

In this preferred embodiment, divergent light of a wavelength $\lambda$ emitted from a laser diode 1 is directly introduced to a polarization converting device 3L and, thereby, converted to a polarized beam 6B having an electric vector oriented in a direction of a tangent of a concentric circle, the phase of which is shifted by $\pi$ at opposite positions. Then, it is inputted to a circular coupler 5 of a radius "a" having concentric gratings of a pitch $\Lambda$, which is formed on a wave guide layer 4, and excites a waveguided light 7 which propagates in a radially outward direction from the center O of the coupler 5. The wave guide layer 4 is formed on a transparent substrate 8 having a refractive index smaller than that of the former and the latter is fixed in the hollow portion of a cylindrical holder 14. The holder 14 is slidably guided by a guide cylinder 15 and can be fixed in position by a screw 16. The longitudinal axis of the guide cylinder 15 coincides with the optical axis of the coupler 5.

The second preferred embodiment corresponds to a case of $\zeta<0$ with respect to the first preferred embodiment and uses divergent light.

Substantially the same effects as those of the first preferred embodiment can be obtained in the second preferred embodiment, which is more compact than the first one since the condenser lens 2 is omitted.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise depart therefrom.

What is claimed is:

1. An optical coupling apparatus comprising:
   a laser source which emits a divergent beam of laser light in a direction along an optical axis of the apparatus;
   a wave guide lying in a plane perpendicular to the optical axis;
   a photocoupler provided on said wave guide and having a concentric periodic structure;
   optical means for introducing the laser light from said laser source to said photocoupler as a polarized beam of light having a spherical wavefront, said optical means including polarization converting means for converting the laser light emitted from said laser source to a polarized beam, the electric field vectors of which are equal at positions diagonally across from each other with respect to a circle centered at said optical axis; and
   said photocoupler being arranged at such a position relative to said laser source that the polarized beam incident on the waveguide is coupled to waveguided light with maximum efficiency.

2. The optical coupling apparatus as claimed in claim 1, and in which said polarization converting means converts the laser light to a polarized beam of light in which the electric field vectors thereof are oriented in a direction tangential to a circle centered on said optical axis or radially thereof and in which the electric field vectors are declined at a declination line perpendicular to said optical axis.

3. The optical coupling apparatus as claimed in claim 1, and in which said polarization converting means converts the laser light to a circularly polarized beam.

4. The optical coupling apparatus as claimed in claim 1, and in which said photocoupler consists of a grating of concentric circles.

5. The optical coupling apparatus as claimed in claim 1, and further comprising guide means for guiding one of said photocoupler and said laser source for movement along said optical axis, and positioning means for fixing said one of said photocoupler and said laser source in position such that said photocoupler is locatable at said position at which the polarized light beam incident on the wave guide is coupled to the waveguided light with maximum efficiency.

6. The optical coupling apparatus as claimed in claim 5, and in which said guide means guides said photocoupler for movement along said optical axis in the apparatus.

7. The optical coupling apparatus as claimed in claim 1, and in which said polarization converting means consists of two transparent substrates and nematic liquid crystal interposed therebetween, and in which the laser light emitted by said laser source is incident on said polarization converting means as linearly polarized light such that said polarization converting means converts the linearly polarized light to the polarized beam, the electric field vectors of which are equal at positions diagonally across from each other.

8. An optical coupling apparatus comprising:
   a laser source which emits a divergent beam of laser light in a direction along an optical axis of the apparatus;
   a wave guide lying in a plane perpendicular to the optical axis;
   a photocoupler provided on said wave guide and having a concentric periodic structure;
   optical means for introducing the laser light from said laser source to said photocoupler as a polarized beam of light having a spherical wavefront, said optical means including polarization converting means for converting the laser light emitted from said laser source to a polarized beam, the electric field vectors of which are equal at positions diagonally across from each other with respect to a circle centered at said optical axis, and condenser lens means operatively optically interposed between said laser source and said photocoupler for making the light emitted by said laser source converge on said photocoupler; and
   said photocoupler being arranged at such a position relative to said laser source that the polarized beam incident on the waveguide is coupled to waveguided light with maximum efficiency.

9. The optical coupling apparatus as claimed in claim 8, and in which said polarization converting means converts the laser light to a polarized beam of light in which the electric field vectors thereof are oriented in a direction tangential to a circle centered on said optical axis or radially thereof and in which the electric field vectors are declined at a declination line perpendicular to said optical axis.

10. The optical coupling apparatus as claimed in claim 8, and in which said polarization converting means converts the laser light to a circularly polarized beam.

11. The optical coupling apparatus as claimed in claim 8, and in which said photocoupler consists of a grating of concentric circles.

12. The optical coupling apparatus as claimed in claim 8, and further comprising guide means for guiding one of said photocoupler, said laser source and said condenser lens means for movement along said optical axis, and positioning means for fixing said one of said photocoupler, said laser source and said condenser lens means in position such that said photocoupler is locatable at said position at which the polarized light incident on the wave guide is coupled to the waveguided light with maximum efficiency.

13. The optical coupling apparatus as claimed in claim 12 and in which said guide means guides said photocoupler for movement along said optical axis in the apparatus.

14. The optical coupling apparatus as claimed in claim 8, and in which said polarization converting means consists of two transparent substrates and nematic liquid crystal interposed therebetween, and in which the laser light emitted by said laser source is incident on said polarization converting means as linearly polarized light such that said polarization converting means converts the linearly polarized light to the polarized beam, the electric field vectors of which are equal at positions diagonally across from each other.

* * * * *